(12) United States Patent
Savvidis (10) Patent No.: US 12,552,538 B2
(45) Date of Patent: Feb. 17, 2026

(54) SEAT ASSEMBLY

(71) Applicant: Charalambos Savvidis, Berlin (DE)

(72) Inventor: Charalambos Savvidis, Berlin (DE)

(*) Notice: Subject to any disclaimer, the term of this patent is extended or adjusted under 35 U.S.C. 154(b) by 132 days.

(21) Appl. No.: 18/694,636

(22) PCT Filed: Sep. 23, 2022

(86) PCT No.: PCT/EP2022/076534
§ 371 (c)(1),
(2) Date: Mar. 22, 2024

(87) PCT Pub. No.: WO2023/046907
PCT Pub. Date: Mar. 30, 2023

(65) Prior Publication Data
US 2025/0002157 A1    Jan. 2, 2025

(30) Foreign Application Priority Data
Sep. 24, 2021    (DE) .................... 10 2021 124 767.5

(51) Int. Cl.
*B64D 11/06* (2006.01)
(52) U.S. Cl.
CPC ............................. *B64D 11/0639* (2014.12)
(58) Field of Classification Search
CPC .............. B64D 11/0639; B64D 11/064; B64D 11/0641; B60N 2002/022; B60N 2/01; B60N 2/3018
See application file for complete search history.

(56) References Cited

U.S. PATENT DOCUMENTS

| 4,834,452 A | 5/1989 | Goodrich |
| 5,106,159 A | 4/1992 | Iwamoto |
| 6,073,986 A | 6/2000 | Neale et al. |
| 6,685,269 B1 | 2/2004 | Freijy et al. |
| 2007/0126270 A1 | 6/2007 | Saint-Jalmes et al. |

(Continued)

FOREIGN PATENT DOCUMENTS

| CN | 109228972 A | 1/2019 |
| DE | 33 12 118 C1 | 9/1984 |

(Continued)

OTHER PUBLICATIONS

International Search Report, mailed Dec. 8, 2022, from PCT/EP2022/076534, 4 pages.

(Continued)

*Primary Examiner* — Timothy D Collins
*Assistant Examiner* — Terri L Filosi
(74) *Attorney, Agent, or Firm* — Workman Nydegger (57) ABSTRACT

A seat assembly with a first seat row that includes a first seat row, and a second seat row including a second seat and located behind the first seat row so that the second seat is located behind the first seat. The first seat has a seating surface provided by a seat structure, and a backrest. The backrest has a vertical pivot axis and is pivotable about the pivot axis, and includes two vertical lateral edges, the horizontal connection of which defines a transverse direction and between which a central line of the backrest is defined in the center. The pivot axis is formed by a vertical axis and is arranged in a position which is displaced from the central line of the backrest in the transverse direction. Pivoting the backrest about the pivot axis releases the seating surface of the first seat for a user of the second seat.

20 Claims, 5 Drawing Sheets

(56) References Cited

U.S. PATENT DOCUMENTS

2008/0217477 A1 9/2008 Cremers et al.
2011/0227385 A1 9/2011 Holder
2020/0139861 A1 5/2020 Nevarez et al.

FOREIGN PATENT DOCUMENTS

| | | |
|---|---:|---:|
| DE | 41 06 153 A1 | 9/1991 |
| DE | 697 25 542 T2 | 11/2003 |
| DE | 102007049646 A1 | 4/2009 |
| DE | 10 2007 055 088 A1 | 5/2009 |
| DE | 102008047659 A1 | 3/2010 |
| DE | 10 2012 010 336 A1 | 11/2013 |
| DE | 10 2016 121 686 A1 | 5/2018 |
| DE | 102017205800 A1 | 10/2018 |
| DE | 10 2017 215 812 A1 | 3/2019 |
| DE | 10 2019 132 165 A1 | 5/2021 |
| EP | 0879733 B1 | 11/1998 |
| EP | 2985175 A1 | 2/2016 |
| EP | 3459852 A1 | 3/2019 |
| EP | 3 670 250 A1 | 6/2020 |
| FR | 2721869 B1 | 1/1996 |
| FR | 2978387 A1 | 2/2012 |
| JP | 2005052405 A | 3/2005 |
| WO | 01/05619 A1 | 1/2001 |
| WO | 2003/008229 A1 | 1/2003 |
| WO | 2011/077363 A2 | 6/2011 |
| WO | 2011/135218 A1 | 11/2011 |
| WO | 2019/089075 A1 | 5/2019 |

OTHER PUBLICATIONS

Search Report of the German Patent and Trademark Office, mailed Sep. 11, 2022.

SEAT ASSEMBLY

FIELD OF THE DISCLOSURE

The disclosure relates to a seat assembly, in particular for an aircraft.

BACKGROUND

Airlines frequently use seat assemblies in aircraft, in which passenger seats or passengers are positioned closely one behind the other. The seating comfort on a passenger seat in an aircraft is defined, in addition to properties such as the seat width, above all by the seat spacing and the legroom of a passenger. For economic efficiency reasons, airlines tend to maximize the number of passenger seats, which is detrimental to seat pitch, legroom, and comfort. For the certification of an aircraft, statistically average body sizes are used by manufacturers. This inevitably leads to the fact that the individual body size of passengers is often significantly larger than the body size on which the approval is based. Aircraft seat pitch is accordingly perceived as being too narrow and uncomfortable, in particular by tall people or people who require a lot of space. Depending on the flight time duration and frequency of flights, negative comfort experiences can be seen as a contributing factor for the selection of future travel and travel modes.

The object of the invention is to provide an improved and more flexible use of the interior or passenger cabin of an aircraft and thus to improve the travel comfort and individual travel requirements of the passengers.

SUMMARY

A first aspect of the invention regards a seat assembly. The seat assembly has a first row of seats, which comprises at least one first seat and a second row of seats arranged behind it, that comprises at least one second seat. The second seat is located behind the first seat. The first seat has a seat surface provided by a seat structure and a backrest, wherein the backrest has a pivot axis and is designed to be pivotable about the pivot axis. The backrest comprises two substantially vertically extending side edges, the horizontal connection of which defines a transverse direction and between which a center line of the backrest is defined centrally (wherein the center line extends through the centers of the connecting lines running in the transverse direction between the side edges is formed which runs in a straight line in the case of symmetrical side edges). In this case, the pivot axis is formed by a vertical axis and is arranged in a position which is offset from the center line of the backrest in the transverse direction. The first seat is provided and designed to release the seat surface of the first seat by pivoting the backrest about the pivot axis for a user of the second seat and in order to offer him a free spacing for individual use.

The invention is based on the idea that, in the event that seats are not occupied, the backrest of the front seat, from the perspective of the second seat, can be pivoted and thus, the free area of the front seat surface can be used individually for other purposes. For this purpose, the front seat can for example be additionally booked for the purpose of individual needs. The arrangement of the pivot axis in an area that is offset from the center line of the first seat in the transverse direction makes it possible for the backrest to swing open to the side, similar to a door. The vertical axis through which the pivot axis is formed extends in the largely vertical direction of the aircraft. Thus, by pivoting the backrest the original seat surface designed for conventional seating can be made freely accessible to a passenger sitting directly behind it on the second seat as an additional usable or storage area and can be used for other purposes and tasks. For example, the surface can serve for additional legroom and as a storage surface for feet/legs.

Passengers, which, for example, have an individual demand for an increased horizontal seat pitch from other passengers for health reasons, can achieve the desired or required seat distance from the next passenger or occupant in front by using the seat surface of the front seat for purposes other than sitting. The disclosure furthermore makes it possible to use the seat surface as a useful surface for further purposes, individual needs and target groups, for example as a lying and/or sleeping surface, without the backrest or the entire seat having to be removed. Examples of further purposes, individual needs and target groups are pregnant women, small children without their own seat space claim, animals and objects in transport boxes or pieces of luggage and persons with restricted mobility.

The occupancy of additionally required seating or storage areas can be offered to passengers, depending on the preferred business model of an air operator, with a booking possibility before or during the flight and thus in a planned manner. Alternatively, the allocation of free front seat surfaces can also take place without the possibility of booking depending on the availability and utilization, unless all the seats of the aircraft are occupied. In contrast to the conventional seat assembly, the fixed seat pitch and thus the distances from the front backrest are therefore designed to be variable by design. In this way, the otherwise unused space can be used and sold effectively according to the requirements of the market or demand, without the conventional seat function being lost. The combination of seat surface and usable surface for purposes other than sitting makes it possible for airlines to offer new seat assemblies in addition to the increasing comfort, which is not possible with conventional seats.

It is pointed out that the characteristic whereby the pivot axis is arranged in a position that is offset from the center line of the backrest in the transverse direction does not necessarily mean that, the center line and the pivot axis run parallel to one another.

There is only a distance in the area of the backrest between the center line and the pivot axis necessary, wherein the center line and the pivot axis can also be designed at an angle to one another. The displacement of the pivot axis relative to the center line can therefore take place in a parallel or angled arrangement.

The term aircraft also includes so-called VTOL-aircraft (VTOL for "vertical take-off and landing") which start and land vertically. These include, for example, helicopters, gyrodyne or air taxis.

In one embodiment variant, it is provided that the pivot axis is arranged in the area of one of the side edges, wherein the backrest can be pivoted to the right or to the left and thereby to the front or to the rear. Depending on the position of the first seat in the interior of an aircraft, it is accordingly possible to pivot the backrest to an outer wall or to a seat adjacent to the right or left. At the same time, it is possible, on one hand, to pivot the first seat forward to the front, wherein the pivoting of the backrest takes place at least partially above the seat surface. On the other hand, at relatively large seat pitch, it is possible to pivot the backrest to the rear, by pivoting the backrest in the direction of an area located behind the seat.

The pivoting of the backrest to an adjacent seat may be advantageous if it is desired that an occupant sitting on the adjacent seat is spatially separated from the released seat surface by the pivoted backrest, for example, when the released seat surface is used by a passenger, who takes his meal or rest his feet.

In a further embodiment variant, the backrest of the first seat can be pivoted between a first, non-pivoted position and a second, pivoted position, wherein the backrest can be locked and unlocked in both positions. The first, non-pivoted position is the position of the backrest, in which a passenger would sit in the seat and in which the transverse direction defined by the backrest typically corresponds to a transverse direction of the aircraft. The locking capability ensures that the backrest remains in these two fixed positions and does not move freely around the pivot axis. This prevents passengers or objects from being damaged by uncontrolled pivoting of the backrest, for example in the case of turbulence during the flight.

In this case, it can be provided that the backrest is pivoted about a substantially right angle in the second pivoted position with respect to the first position. The inventive concept also corresponds to a pivoting which corresponds only approximately to a rotation by 90° and lies in a range of 75° to 90° or a range of 90° to 105°, in particular in a range of 80° to 90°. For this purpose, a pivoting in a front direction is preferably provided. However, in an alternative embodiment, pivoting to the rear is also possible.

The directional descriptions "front" and "rear" relate to a longitudinal axis which corresponds to the typical direction of movement of the aircraft; the description "top"/"bottom" refers to the vertical axis and the description "left"/"right"/ "laterally" to the transverse axis of the aircraft.

In a further embodiment, the first seat has a lock. The locking mechanism is designed to lock the backrest in the first position and the locking can basically be done by passengers and/or flight crew members. The locking device comprises a snap-action latch and a snap-in bolt. The latch is formed by a recess formed in a hinge plate, directly in the seat structure or in an armrest that is part of the seat structure. The snap-in bolt is spring-mounted, protrudes from the backrest and is designed to be received for locking by the snap-action latch. The seat structure is for the most part arranged below the seat surface and fastened to the first seat on a preferably flat surface of the aircraft. In this case, the seat construction can connect a plurality of seats, in particular when the seats are arranged as a row of seats. In this case, the seat construction comprises two arm supports which extend upwards laterally from the backrest in order, for example, to provide a fastening for two armrests. It can be provided that the snap bolt is formed by a spring mechanism arranged in the backrest, such as a door lock in a door, is pushed out of the backrest and thus the snap bolt always automatically falls into the snap-action trap.

In principle, it can alternatively be provided that the snap-action mechanism with the snap-action latch and the snap-action bolt is also arranged in a different way. It can thus be provided that the first seat has a locking mechanism which is designed to lock the backrest in the first position, wherein the locking mechanism comprises a snap-action latch and a snap-in bolt, the snap-in latch is formed by a depression which is formed in the backrest. In this case, the snap-in bolt is spring-mounted and protrudes from the hinge plate, the seat structure or the armrest and is designed to for locking by the snap-action latch.

In a further variant, the locking of the backrest in the pivoting position is provided by a mechanical latching securing means, a lockable hinge or a manual device. In this case, the backrest can, for example, be secured manually by manually inserting a blocking against pivoting back.

In a further embodiment variant, it is provided to use the principle of a snap latch and a snap bolt for locking the backrest in the pivoted, second pivot position. In this case, for example, the corresponding snap-in latch is embedded in the seat structure and the snap-in bolt is arranged on a lower side of the backrest.

In a further exemplary embodiment, the locking mechanism can be released by an operating device which mechanically or electrically provides a force transmission to the bolt in order to release or lock the bolt. For this purpose, the operating device is advantageously arranged on a rear side of the backrest or on an upper edge of the backrest, so that it is possible in a simple manner, to actuate or control the operating device individually for the respective seat. Alternatively, however, the operating device can be arranged at any other location on the backrest or in an armrest or during the electrical force transmission centrally and thus be arranged centrally and therefore controllable by the flight crew or cabin crew members.

In a further exemplary embodiment, the operating device can be operated electronically and/or remotely controlled. In this way, it is possible in a particularly simple manner for crew members, have the control over the backrest position and, for example, to lock them during takeoff or landing without having to move to each individual seat.

In this case, the locking can be realized by a mechanical force transmission, for example via cable pulls or rods. It is preferably provided here that the operating device is a single-handed twist grip, the basic function of which is similar to that of house doors, by means of the rotary actuation of which a force transmission for locking is made possible, and the locking is released. By actuating the operating device, the snap bolt is released from the snap catch via a cable pull and against the spring force of the snap bolt in the direction of the center line of the backrest. After releasing the snap bolt, the backrest can be pivoted about the pivot axis. In order to prevent inadvertent release by, for example, passengers or children, the operating device can comprise an additional securing or locking device.

In the event that locking by a snap bolt is not sufficient, provision can be made to use an active locking alternatively or additionally. In this case, similar to a door lock, a bolt is advanced into a recess without being pulled out again. In this way, an unintentional release of the backrest is excluded. This can be necessary, in particular, as a safety aspect for the certification or approval of the aviation operations.

Alternatively, the locking mechanism can be releasable via an unlocking mechanism connected to an electronic system. In this case, the unlocking mechanism can be actuated, for example, by actuating an electronic switch or triggered via a wireless Signal transmission. The wireless signal transmission additionally makes it possible for the operating device to be triggered by any desired space in the aircraft. In one embodiment variant, an operation is provided by means of mobile app on a personal mobile device, by remote control or via a Bluetooth device.

Furthermore, it can be provided that the operating device can be controlled centrally. Thus, for example, the locking of the backrest can be accessed via the electronic signal transmission from a central point. This is particularly advantageous if a plurality of operating devices of a plurality of passenger seats can be operated in parallel via the central location, for example by a FAP (flight attendant panel).

In a further exemplary embodiment, the locking device has a plurality of bolts. The provision of a plurality of bolts, in particular snap-on bolts, for the load absorption serves for this purpose, that the use of the first seat is ensured even in the case of a load pick-up required for certification in aircraft, even under fail-safe conditions (assumed failure of a securing bolt).

In a further embodiment, the pivot axis is provided by at least one articulated or rotatable connection, that connects the seat structure to the backrest.

In this case, the seat structure can form a vertical extension which provides the articulated connection, and which forms the pivot axis. In this case, the vertical extension can be designed like an axis of rotation of a rotatable office chair on which the backrest rests.

In this case, it can be provided that the pivot axis has at least one hinge. In particular, the design of a double or multiple hinges is provided in embodiments. A double hinge consists of two individual hinges, which are arranged one above the other and have an increased axle stability. In this case, the hinge or the double hinge can have an integrated latching function, which additionally allows the backrest to latch out of the first pivot position in the second pivot position after pivoting. In a further embodiment variant, the pivoting of the backrest can also take place with the aid of electrically operable hinges, which additionally comprises a motor for pivoting.

In a further embodiment, the hinge is connected to the seat structure via a screw or welded connection and to the frame structure of the backrest, on the other hand. The frame structure thereby absorbs the mechanical loads of the backrest and forms a framework for the backrest. In alternative embodiments, the hinge can also be connected via further connecting means, for example, rivets may be connected.

In a further variant, the first seat has a damping mechanism which is provided and designed to damp a pivoting movement of the backrest about the almost vertical pivot axis. In this case, the damping mechanism can be integrated, for example, into the hinge. The damping prevents an uncontrolled, too fast rotation of the backrest and can thus prevent, for example, jamming of body parts. As a result of the slowed pivoting of the backrest due to the damping mechanism, the safety of the seat is thus increased.

In a variant, the seat assembly comprises a status display which indicates whether the backrest of the seat is in a locked or open position. This can be advantageous in particular before a safety aspect. For example, in aviation, it may be necessary for all seats to be in a locked position during landing or starting. In this case, the locking state can be displayed by the status display near the seat or centrally, for example, on a FAP (flight attendant panel). In this case, the status display can be in the form of two-color LEDs (red for an open/rotated backrest and green for a closed or additionally secured/locked backrest) for at least one seat with a rotatable backrest or for an entire row of seats with rotatable backrests.

In a further embodiment variant, the first seat has two armrests, wherein at least one of the two armrests can be folded or removed from the first seat or the seat structure upwards. In this case, two arm supports, which are part of the seat structure, project upwards along an area located at the side of the side edges. At a height corresponding to the height of an elbow of a passenger sitting in the first seat, the armrests are connected to the armrest in a foldable manner. In the case in which the backrest is pivoted forwards and a passenger accordingly no longer uses the first seat for sitting purposes, the armrests are also unnecessary and can accordingly be folded up. Moreover, the folding up of the armrest can facilitate pivoting of the backrest because when the armrest is folded down in the normal position, it could get in the way of the full swivel movement of the backrest.

In a further embodiment variant, the first seat can comprise two armrests, wherein at least one of the two armrests can be removed. As with the foldable variant of the armrests, it is hereby advantageously connected that pivoting of the backrest can be facilitated and the armrest is unnecessary when the backrest is pivoted.

In a further embodiment, the seat assembly is part of a passenger seat row assembly in an aircraft.

With the disclosure, it is possible, particularly in aircraft with dense seating, to make the fixed seat distances, which are perceived to be too narrow, and thus the distances to the front backrest more variable in terms of construction, so that the space is utilized more flexible, and individual needs of passengers can be considered. The first seat thus solves in particular the basic and generally known problem of restricted legroom, in particular in the segment of low-cost airlines or airlines, which merely have a compressed economy seat class, partially in conjunction with premium economy seat classes.

By means of the pivotable backrest, a passenger, even in the case of a long multi-hour flight, can also obtain a seating comfort in a narrowly occupied passenger cabin, which is otherwise only offered in a premium economy, business class or first class.

The average PLF (passenger load factor) of an aircraft is very different. Usually, there are only few airlines which always fly without empty seats. Instead, it is more the case, that most flights are carried out with free and unused seats. Especially for non-fully booked flights, the seat assembly enables more comfort for passengers and an improved travel experience. In this case, it can also be provided that the seats can be added and booked as flexible seats.

For example, if taller than average people or people with individual travel needs are flying, depending on the business and booking model of an airline, they can also book the front seat and get enough legroom by swivelling the backrest on the front seat, or they can use the seat surface for other individual needs.

In addition, the pivoting function in small and smallest aircraft, including VTOL aircraft, allows an easier entry over a row of seats when the backrest is pivoted, so that access into the aircraft, for example for the flight crew members, could become possible even without or with a particularly narrow central aisle. In this case, it could be possible, that one entry door would be required less.

In a further exemplary embodiment, a plurality of seats of a seat row form a seat row arrangement which has a common substructure, wherein the first seat and the second seat are each part of a seat row arrangement. A seat row of an aircraft may be formed by one or more passenger seat row arrangements.

In this case, it can be provided that the first seat of the seat assembly is provided and designed as a window seat. However, this is merely an exemplary embodiment.

Alternatively, the pivotable seat may be, for example, a central seat or aisle seat or a window and aisle seat.

Furthermore, it can be provided that the pivotable backrest of the first seat can be pivoted to a window side. In this way, the pivoted backrest can be pivoted in a space-saving manner with respect to the on-board wall side of the aircraft, so that the backrest is not disturbing in the aircraft interior.

Alternatively, the seat assembly can also be designed such that the pivotable backrest of the first seat can be pivoted into a direction facing away from the window side. This can be advantageous in particular if a spatial separation between a neighbouring seat and the seat surface released by the pivoting of the backrest is desired, for example, if a passenger located behind the seat places his feet on the seat surface.

Furthermore, it can be provided that all seats of the first row of the seat assembly comprise a backrest which can be pivoted. In this case, the seat assembly is particularly variable, so that a good adaptation to the space requirements of the passengers is made possible as a function of the number of occupied places.

In a further embodiment, the second seat is designed in the same way as the first seat, so that the seat assembly can still be made more variable.

In a further aspect of the invention, the invention relates to an aircraft having a seat assembly which is designed according to the present disclosure.

A further aspect of the invention relates to a method for utilizing seat surfaces in an aircraft. In this case, a backrest of the first seat, which comprises two substantially vertically extending side edges, by means of the horizontal connection of which a transverse direction and between which a center line of the backrest is defined centrally, can be pivoted about a pivot axis offset from the center line in the transverse direction and formed by a vertical axis. The backrest can then be pivoted out of a first, non-pivoted position into a second, pivoted position or vice versa, wherein the backrest is locked in the respectively occupied position. In this case, a seat surface of the first seat is released, and the exposed seat surface of the first seat is used for individual use by a user of a second seat, wherein the second seat is located behind the first seat.

In a further aspect of the invention, the present invention relates to the use of a seat according to the disclosure, wherein the seat is used by the user of a second seat, which is arranged behind the first seat, and in such a way that by pivoting the backrest about the pivot axis, the seat surface of the first seat is released and made available for individual use by the user of the second seat.

In this case, the area of the seat surface can be used as a leg support for the user of the second seat.

Furthermore, the area of the seat surface can be used for a small child or for the seat shell for a small child.

In addition, the seat may be used in an aircraft. In particular, use can be provided in a VTOL aircraft. Apart from this, however, use can also be provided in a passenger train, a travel bus, an automobile, a passenger ship, or another transport means for passenger transport.

BRIEF DESCRIPTION OF THE DRAWINGS

Aspects of the invention are explained in more detail below with reference to the figures of the drawing based on an exemplary embodiment.

DETAILED DESCRIPTION

Figure 1:
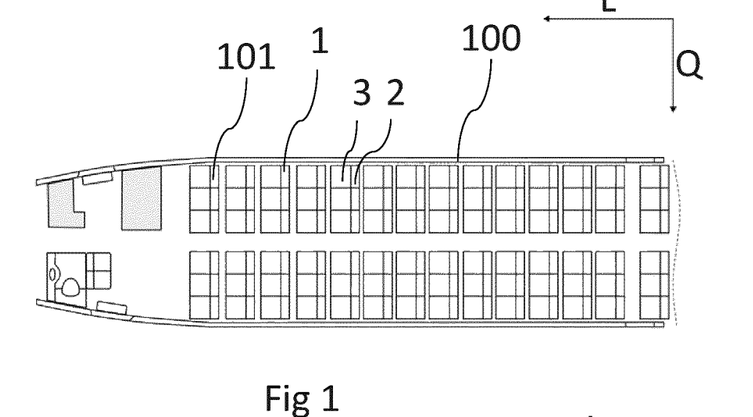
FIG. 1 shows an interior of an aircraft with passenger seat row arrangements which are arranged in seat rows.
Figure 2:
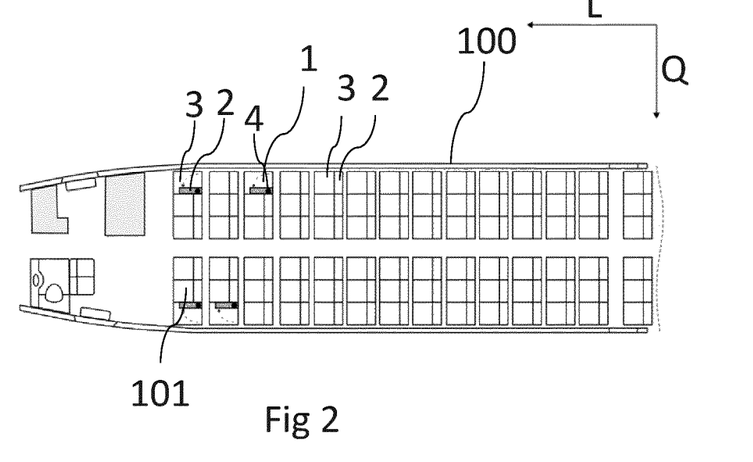
FIG. 2 shows an interior of an aircraft corresponding to FIG. 1, in which the backrest is pivoted forward on some window seats of the passenger seat row arrangements.
Figure 3:
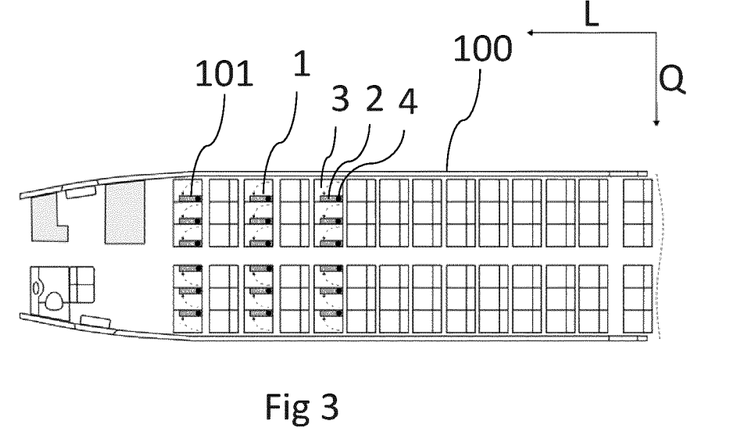
FIG. 3 shows an interior of an aircraft corresponding to FIGS. 1 and 2, in which all backrests of the seats of the passenger seat row arrangements are pivoted forward in a plurality of rows of seats, wherein the backrests of the seat rows arranged behind are not pivoted.

FIGS. 1 to 3 show a perspective from above, an interior of an aircraft delimited by an aircraft wall (100), in which passenger seats 1 are arranged. FIG. 1 shows a part of the aircraft interior with a plurality of passenger seat row arrangements 101, which are each formed from three conventional seats and are arranged in parallel rows of seats. The seats of the passenger seat row arrangement 101 are distinguished by a common substructure. In this case, a row of seats is formed in each case by two passenger seat row arrangements 101, which in this example are separated by only one central aisle, wherein this is to be understood merely as an example. An alternative layout of the aircraft interior and a different number of gears can be provided, in that the individual seats are individual constructions without a plurality of passenger seats being joined to passenger seat row arrangements.

The aircraft has a longitudinal axis L, which corresponds to a longitudinal extension of the aircraft, and a transverse axis Q. The direction of the transverse axis Q corresponds to the orientation of the seat rows. In this case, it corresponds to a transverse direction of the aircraft seat 1, as is illustrated in more detail with reference to FIG. 4. In this view, a backrest 2 and a seat surface 3 arranged in front of the backrest 2 are shown schematically per seat. The directional descriptions "front"/"rear" refer to the longitudinal axis L, the description "above"/"below" refers to a vertical axis H and the description "left"/"right"/"laterally" to the transverse axis Q.

FIG. 2 shows a seat assembly according to the disclosure in the interior of the aircraft, in which individual seats 1 of the passenger seat row arrangements 101 comprise a pivotable backrest 2 which consists of a first position of 0°, which corresponds to a normal seating position for a seated passenger, are pivoted forward into a second pivot position. A pivot axis 4 about which the backrest 2 is respectively rotatable is located in an area of the edge of the backrest 2, so that the backrest 2 similarly to a door, can be pivoted forward. In this case, in the exemplary embodiment shown, the pivoted backrests 2 are only on window seats and therefore arranged at the lateral end of a row of seats adjacent to the aircraft wall 100 and is shown only in a pivoting direction. In this case, the pivot axis 4 of the backrest 2 is arranged in each case on the side facing away from the aircraft wall 100, so that the backrest 2 pivots away from the aircraft wall 100 and is arranged in a second position, swivelled 90° forward and toward a neighboring seat.

The pivoted backrest 2 makes it possible for the seat surface 3 to be used in some other way. A passenger or occupant, which travels in the seat behind it, can thus use the released space, for example, for improved legroom. In alternative exemplary embodiments, not shown, it may be provided to pivot the backrest 2 not forward, but to the rear, in order to use the seat surface 3.

FIG. 3 shows an aircraft interior in which all seats 1 are pivoted forward alternately in a row of seats or in the passenger seat row arrangements 101 forming them, wherein the backrest 2 is not pivoted in the seat row arranged behind it. Thus, for all passengers who are located in seats, which is arranged behind the seats 1 arranged in front of the backrest 2 in the row, an increased space with improved legroom is made available.

Figure 4:
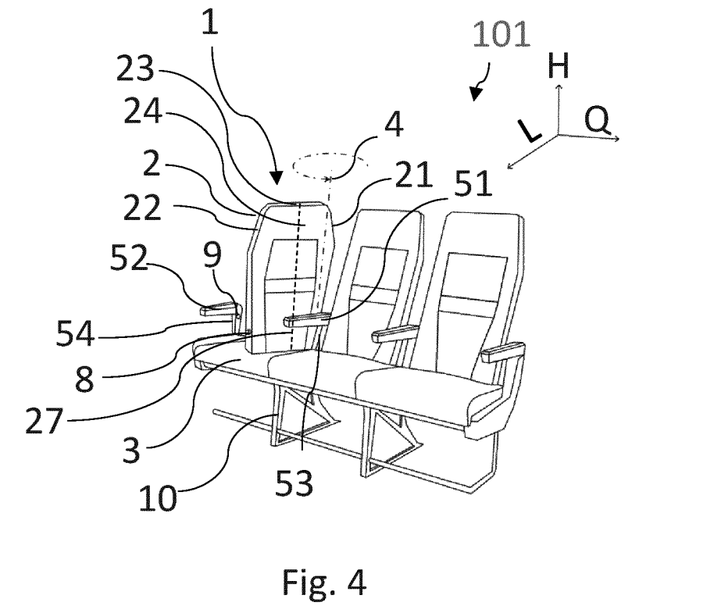
FIG. 4 shows three adjacent passenger seats, which together form a row of seats, wherein, in the case of one of the seats, the backrest is pivoted to the front by 90°, wherein the pivot axis is arranged on the side of the seat facing the neighbouring seat.

FIG. 4 shows three adjacent passenger seats 1, which together form a passenger seat row arrangement 101. In this case, one of the adjacent seats 1, the backrest 2 is pivoted laterally by almost 90° into a second position, so that a front side 24 of the backrest 2 faces the adjacent seat. In the case of the two further conventionally designed seats 1, on the other hand, the backrest 2 is in each case arranged in the original position of 0°. Thus, the arrangement of FIG. 4 corresponds to the arrangement shown in FIG. 2, in which the backrest 2 of a window seat is pivoted forward. The pivotable backrest 2 is pivoted about a pivot axis 4. In this case, the pivot axis 4 extends in a direction substantially corresponding to the direction of an almost vertical axis H of the aircraft.

The backrest 2 has two side edges 21, 22, wherein the first side edge 21 is defined by having a smaller distance from the pivot axis 4 than the second side edge 22. Both side edges 21, 22 extend substantially in the vertical direction. In addition, the backrest has an upper edge 23. Typically, the side edges 21, 22 are formed symmetrically in the seat 1.

In the first, non-pivoted position of the backrest of 0°, a transverse direction of the seats 1 is defined by a horizontal connection between the first side edge 21 and the second side edge 22. The center between the side edges 21, 22 defines an imaginary center line 27 of the backrest 2. In this example, the pivot axis 4 is arranged in the area of the first side edge 21. In further alternative exemplary embodiments, not shown, the pivot axis 4 can also be arranged in an alternative position in the seat. However, it is always provided that the pivot axis 4 is offset in the transverse direction from the center line 27 of the backrest 2, so that the backrest 2 is pivotable laterally, such as a door. An offset in the transverse direction and in this case at a distance from the adjacent lateral edge is also possible. The pivot axis 4 can run parallel or at an angle to the center line 27.

It is pointed out that the pivot axis 4 does not necessarily have to coincide exactly with the vertical axis H of the aircraft, namely when the pivot axis 4 does not extend exactly upward, for example because the backrest of the seat 1 is slightly inclined. Nevertheless, it is a vertical axis, since it runs primarily in the vertical direction.

A seat structure 10 forms a mechanical framework, which supports the seat 1 on a floor (not shown) and additionally connects the seat 1 to the adjacent conventional seats 1 of the passenger seat row arrangement 101. In this case, a first arm support 53 and a second arm support 54 form an upper part of the seat structure 10 and project laterally upwards in order to anchor a first armrest 51 and a second armrest 52. The two armrests 51, 52 serve to allow a passenger to support the arms thereon. Accordingly, they extend at a height corresponding to the height of an elbow of the passenger sitting in the seat 1, from the arm supports 53, 54 forward. In this case, the first arm support 53 and the first armrest 51 are arranged in the area of the first side edge 21 and the second arm support 54 and the second armrest 52 are arranged in the area of the second side edge 22. The armrests 51, 52 are not absolutely necessary in order to use the pivotable backrest. A use without armrests or with arm rests which can be folded upwards is also provided in further exemplary embodiments which are not shown.

In this exemplary embodiment, the first arm support 53 with the backrest 2 is connected to the backrest 2 via a hinge, which is explained in more detail with reference to FIG. 6, and the second arm support 54 is connected to the backrest 2 via a snap mechanism.

By pivoting the backrest 2 forward, the second side edge 22 is removed from the second armrest 52. Thus, the second side edge 22 forms a free end of the backrest 2. A snap bolt 8 projects from the second side edge 22. The snap bolt 8 is designed to latch in a snap latch 9 formed as a depression in the second arm support 54 and thus to engage the backrest 2 to fix the first, non-pivoted position. In this case, the snap bolt 8 is resiliently mounted in the backrest 2, so that the snap bolt 8 automatically enters the snap latch 9 for locking, when the backrest 2 is in the first position.

The snap bolt 8 is connected to an operating device (corresponding to the operating device 7 of FIG. 5) formed on a rear side 25 of the backrest 2. Via the operating device, it is possible to retract the snap bolt 8 against the spring force, so that the backrest 2 can be detached from the second armrest 54 and then pivoted.

The operating device is designed as a single-handed twist grip, by means of which a force transmission for unlocking the snap mechanism is made possible by means of the rotary actuation thereof. In this case, the operating device is connected to the snap bolt 8 via a cable pull (not shown) in such a way that, when the operating device is rotated, the snap-action bolt 8 moves in the direction of the center line 27 of the backrest 2 and thus retracted counter to the spring force and the backrest 2 is released from the snap latch 9. After releasing the snap bolt 8, the backrest 2 can be pivoted about the pivot axis 4 into the second pivoted position.

In this exemplary embodiment, the pivot axis 4 is arranged on a side of the seat 1 facing the adjacent seat 1, so that the backrest 2 is pivoted towards the adjacent seat 1. In this way, a spatial separation between the adjacent seat 1 and the seat surface 3 which has become free by the pivoting of the backrest 2 is achieved.

Figure 5:
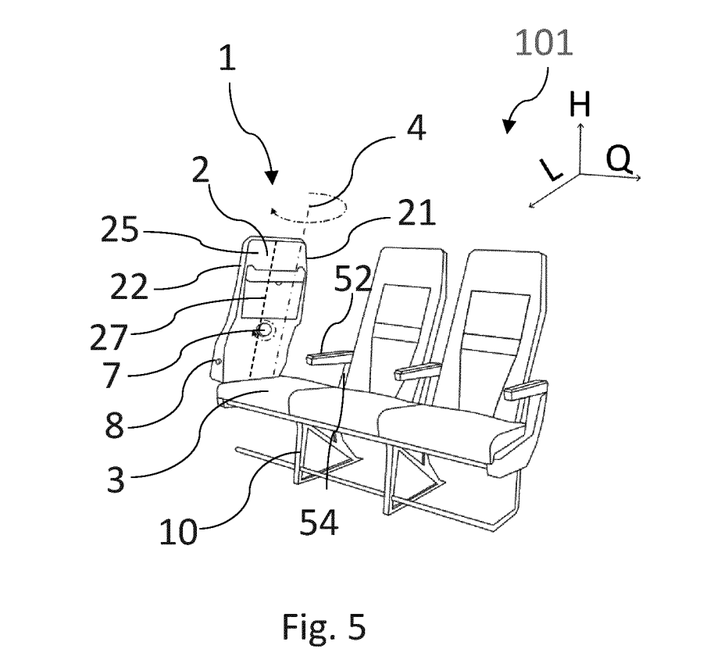
FIG. 5 shows an arrangement of a row of seats corresponding to FIG. 4, wherein the pivot axis is arranged on the side of the seat facing away from the adjacent seat.

FIG. 5 shows an arrangement of a passenger seat row arrangement 101 corresponding to FIG. 4, wherein, in contrast to the previous exemplary embodiment, the pivot axis 4 is arranged on the side of the seat 1 facing away from the adjacent seat.

In this view, the backrest 2 is pivoted forward by almost 90°, so that the backrest 2 is pivoted away from the adjacent seats and a rear side 25 of the backrest 2 is visible. In this perspective view, the first arm support 53 and the first armrest 51 are concealed by the pivoted backrest 2. Alternatively, the first armrest 51 can be removed or folded upwards in order to achieve better pivotability of the backrest 2. By contrast, the above-mentioned operating device 7 can be seen.

Figure 6:
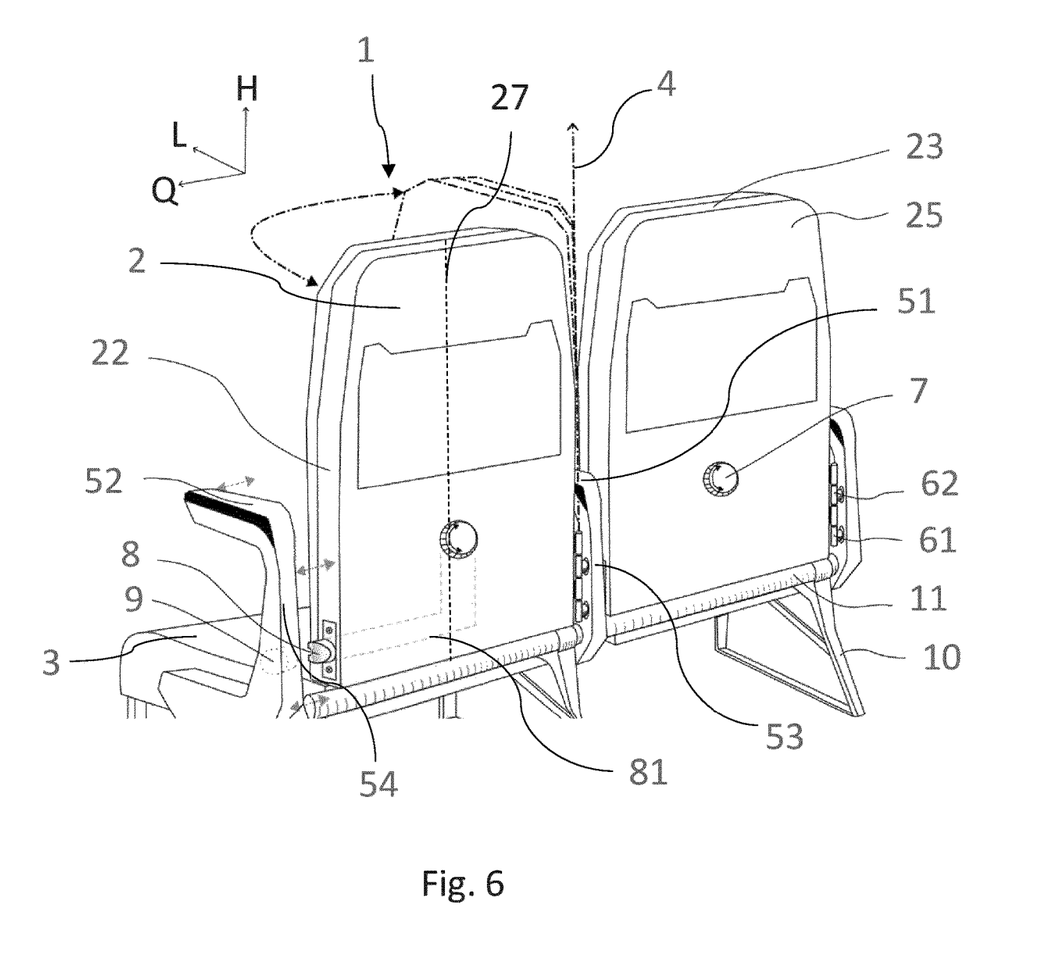
FIG. 6 shows a perspective side from the rear of two seats, each of which has a pivotable backrest, wherein locking elements for locking the seats are shown and an arm support for better comprehensibility in unfastened/unmounted state is shown.

FIG. 6 shows, from a perspective, laterally from the rear, two seats 1 with in each case one pivotable backrest 2, wherein the pivotability of the backrest 2 on the left of the two illustrated seats 1 is indicated by dashed lines.

The backrest 2 is pivotally connected to the first arm support 53 via a double hinge consisting of an upper hinge 62 and a lower hinge 61.

For the sake of clarity, the second arm support 54 is shown spaced apart from the backrest 2 in this illustration, so that the snap mechanism is visible. The snap bolt 8 projects from the second side edge 22 of the backrest 2 and is connected to the operating device 7. A dashed line 81 symbolizes the connection between the snap bolt 8 and the operating device 7. The snap bolt 8 projects precisely at the point from the second side edge 22, on which the snap latch 9 is embedded in the second arm support 54. The snap latch 9 can thus receive the snap bolt 8 for latching the backrest 2 in the first position.

Figure 7:
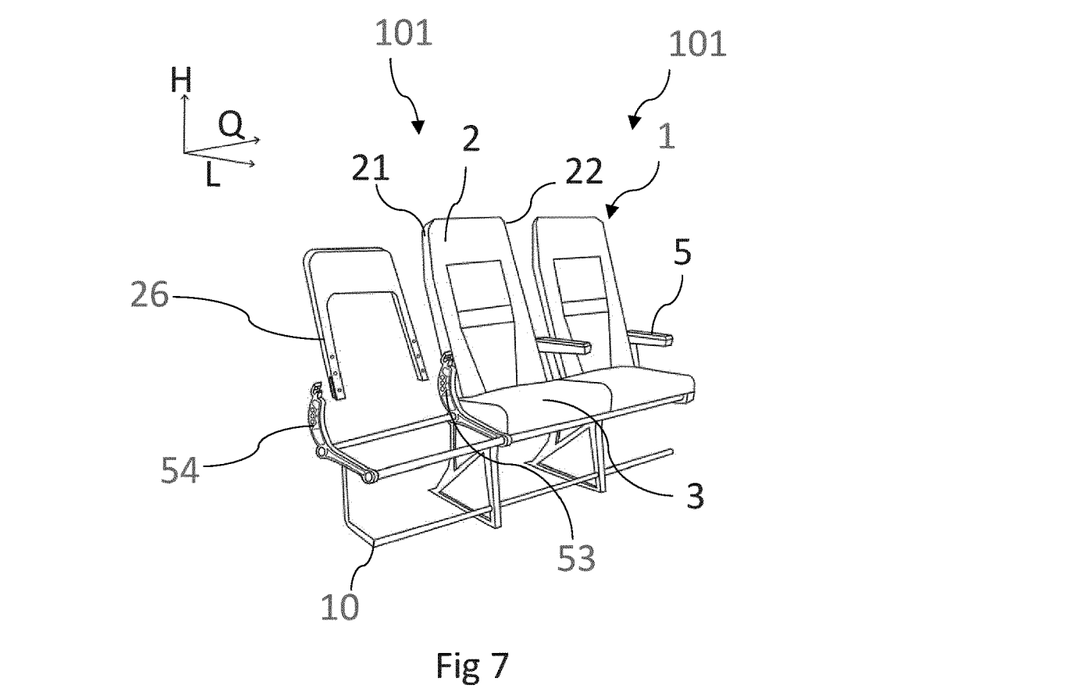
FIG. 7 shows a seat row with three seats, wherein an armrest is removed in one of the seats and the backrest is only illustrated with respect to its frame construction.

FIG. 7 shows a passenger seat row arrangement 101 consisting of three seats 1 which are interconnected by a common seat substructure 10. In this case, the seats 1 each comprise an arm support 53, 54 on both sides, which are part of the seat substructure 10. The armrests 52 each extend forward from the arm supports 53, 54. In this case, the armrests 51, 52 are designed to be removable from the arm supports 53, 54. In alternative exemplary embodiments, it is alternatively provided that the armrests 51, 52 are designed to be fixed or foldable. In the case in which the backrest 2 is pivoted forwards and a passenger accordingly no longer uses the seat 1 for sitting purposes, the armrests 51, 52 are also unnecessary and can accordingly be dispensed with. Moreover, depending on the structural design and thickness of the backrest, an armrest could be in the way of pivoting the backrest 2 so that it may even be necessary to remove or fold the armrest upwards, in order that the backrest 2 can be pivoted completely into the second, pivoted position.

In the exemplary embodiment of FIG. 7, the two armrests on a seat 1 shown on the left are not shown for a comprehensible illustration. Furthermore, only one frame structure 26, which ensures the stability of the backrest, is shown by the backrest of the seat 1. In this case, it is provided for the ability to pivot that the frame structure 26 is connected to a hinge, as shown in FIG. 8.

Figure 8:
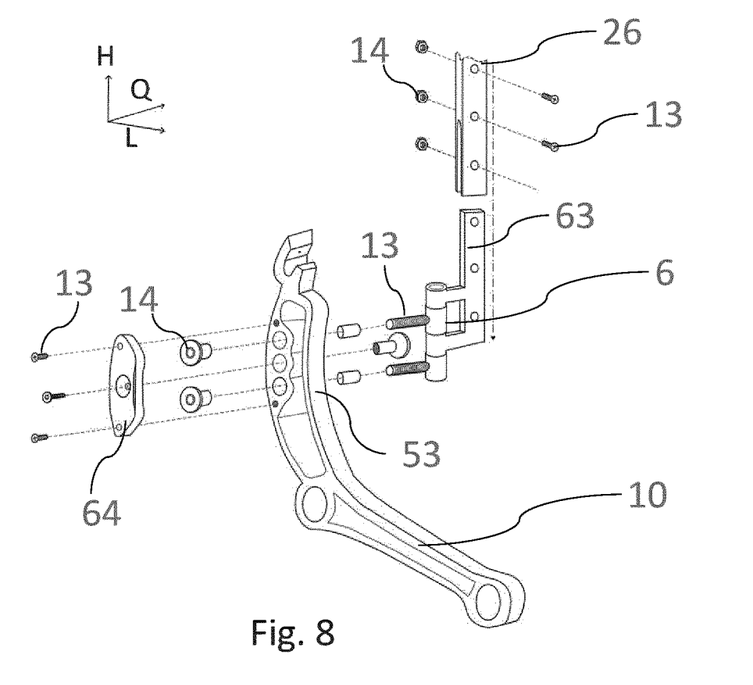
FIG. 8 shows an exploded view of a hinge arrangement for a pivotable backrest of a seat according to FIG. 7.

FIG. 8 illustrates an exploded view of a hinge assembly. In this case, a hinge 6 is connected to the first arm support 53, which is part of the seat substructure 10, and, on the other hand, is fastened to the frame structure 26 of the backrest 2. In this embodiment, the first armrest 51 is not shown by the first arm support 53. The hinge 6 is connected via two threaded screws 13 and two sleeve nuts 14 holes of the first arm support 53 are anchored. In addition, a hinge plate 64, which covers the sleeve nut 14, is arranged on the side of the armrest 53 facing away from the hinge 6. The hinge plate 64, in which the snap-action latch 9 is inserted centrally, is fastened on the side facing away from the hinge with threaded screws 13, which are embedded in corresponding threaded bores of the arm support 53, 54. Furthermore, the hinge 6 is connected to the frame part 26 of the backrest 2 by means of a further screw connection via a hinge frame 63.

A hinge arrangement according to FIG. 8 may also be provided for pivotability of seats according to FIG. 6.

Figure 9:
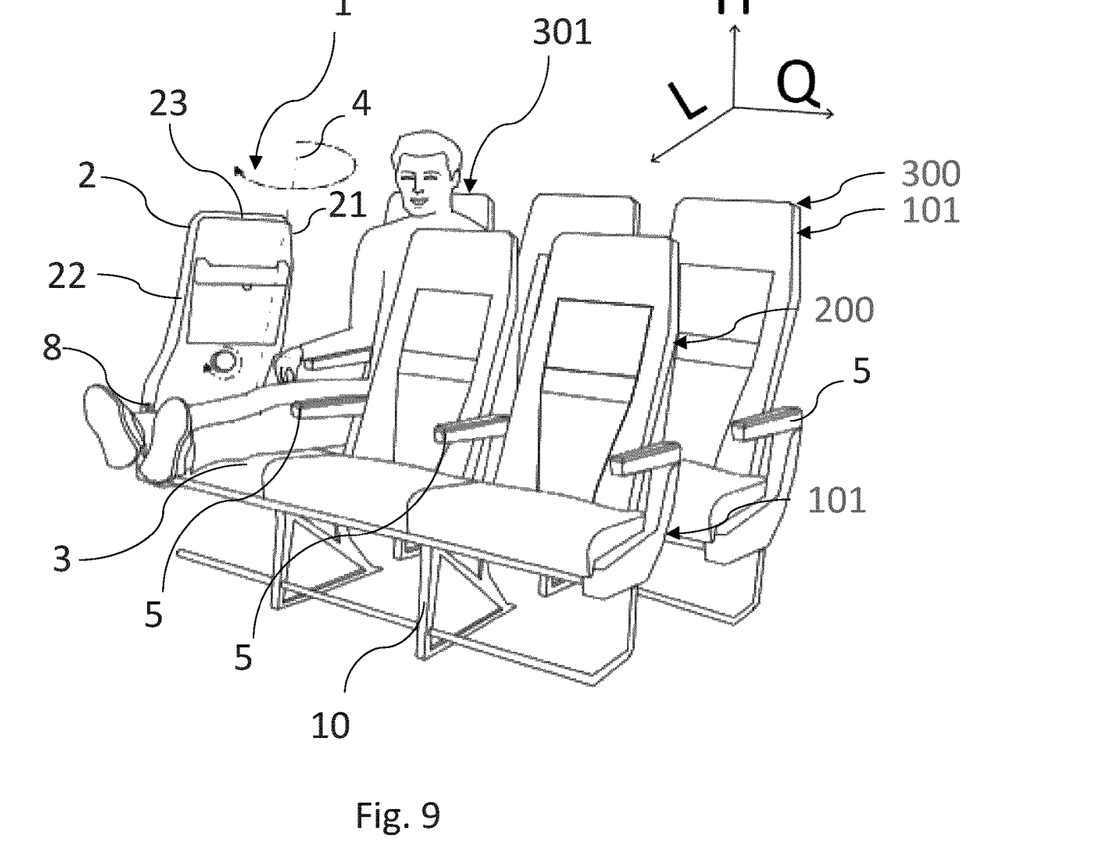
FIG. 9 Is a perspective view of two rows of seats, wherein a seat of the front row of seats has a pivoted backrest and a passenger is arranged in the rear row of seats, which his legs lie on the freely wound seat surface.

FIG. 9 shows a preferred configuration in which a passenger can deposit his legs on the seat surface 3 of the seat 1 arranged in front of it. The configuration includes a first row of seats 200 and a second row of seats 300. In this case, two passenger seat row arrangements 101 of the respective seat rows 200, 300 arranged one behind the other are shown. In the front passenger seat row arrangement 101 of the first row of seats 200, the backrest 2 of one of the seats 1 is pivoted forward so that the seat surface 3 can be used for other purposes. This configuration corresponds to the arrangement known from FIG. 5.

A passenger is located on a second seat 301 of the rear seat row 300. The passenger sits precisely behind the seat 1 of the first row of seats, in which the backrest 2 is pivoted and has his legs extended to the exposed seat surface 3. This allows taller people in particular to have improved legroom. The seat 1 located in front of the passenger can be booked additionally by the passenger during booking. This gives airlines new marketing opportunities.

Other applications for the individual use of the free seat surface 3 relate to the provision of a playing surface for a small child, which has no own seat, or the provision of a surface for a seat shell of a small child. The possibilities for the individual use of the seat surface 3 of the seat 1 of the front row are in this case varied. Other uses relate to the storage of animals in transport boxes, luggage, food or beverages.

The disclosure is not limited in its design to the exemplary embodiments illustrated above, which are to be understood merely by way of example. Thus, in the exemplary embodiment shown, the seat shown is arranged in an aircraft. However, inserts in other aircraft such as helicopters or air-taxis (VTOL vertical take-off and landing aircraft) are also possible.

Furthermore, it is pointed out that the seat according to the disclosure is not necessarily part of a passenger seat row arrangement which comprises a plurality of seats but can also form a single seat.

It is also pointed out that in further embodiments the seat can additionally be designed to be pivotable in its inclination. In such a case, it is provided, for example, that a pivotability according to the disclosure can be carried out when the backrest of the seat is in the vertical position.

It is pointed out that any of the described characteristics can be used separately or in combination with any other characteristics if they do not mutually exclude one another. The disclosure expands to all combinations and sub-combinations of one or more characteristics described herein and includes them. If ranges are defined, they include all values within these ranges as well as all sub-ranges that do not fall within a range.

The invention claimed is:

1. A seat assembly comprising:
a first row of seats having at least one first seat,
a second seat row arranged behind the first row, the second seat row comprising a second seat, wherein the second seat is located behind the first seat,
wherein the first seat comprises:
  a seat surface, provided by a seat structure,
  a backrest,
  wherein the backrest has a pivot axis and the backrest is pivotable about the pivot axis,
  wherein the backrest comprises two substantially vertically extending side edges, a horizontal connection of which defines a transverse direction and between which a center line of the backrest is defined centrally,
  wherein the pivot axis is formed by a vertical axis and is arranged in a position offset from the center line of the backrest in the transverse direction, and
wherein the first seat is configured to release the seat surface of the first seat by pivoting the backrest about the pivot axis for a user of the second seat and further configured to provide the user with a free area for an individual use.

2. The seat assembly of claim 1, wherein the pivot axis is arranged in an area of one of the side edges, wherein the backrest is pivotable to the right or to the left.

3. The seat assembly of claim 1, wherein the backrest is pivotable between a first, non-pivoted position and a second, pivoted position, wherein the backrest is lockable and unlockable in both the first, non-pivoted position, and the second, pivoted position.

4. The seat assembly of claim 3, wherein the backrest in the second, pivoted position is pivotable through a substantially right angle with respect to the first, non-pivoted position.

5. The seat assembly of claim 3, wherein the first seat has a lock which is configured to lock the backrest in the first, non-pivoted position, wherein,
the lock comprises a snap latch and a snap bolt,
the snap latch is formed by a recess which is in a hinge plate, directly on the seat structure or on an arm support, which is part of a seat construction, and
the snap bolt is resiliently mounted, protrudes from the backrest and is configured and arranged to be received by the snap latch for locking.

6. The seat assembly of claim 5, wherein the lock is releasable by an operating device which is configured to provide, mechanically or electrically, a force transmission to the snap bolt, in order to unlock or lock the snap bolt.

7. The seat assembly of claim 3, wherein the first seat has a lock which is configured to lock the backrest in the first, non-pivoted position, wherein,
the lock comprises a snap latch and a snap bolt,
the snap latch is formed by a recess which is formed in the backrest, and
the snap bolt is resiliently mounted, protrudes from a hinge plate, the seat structure, or an arm support and is configured to be received for locking by the snap latch.

8. The seat assembly of claim 1, wherein the pivot axis is provided by at least one articulated or rotatable connection which forms the backrest with the seat structure.

9. The seat assembly of claim 8, wherein the seat structure forms a vertical extension which provides the at least one articulated or rotatable connection.

10. The seat assembly of claim 1, wherein the pivot axis has a hinge.

11. The seat assembly of claim 1, wherein a plurality of seats of a seat row form a seat row arrangement which has a common substructure, wherein the first seat and the second seat are each part of a seat row arrangement.

12. The seat assembly of claim 1, wherein the first seat is provided and designed as a window seat.

13. The seat assembly of claim 1, wherein multiple seats of the seat assembly are formed with a pivot axis.

14. The seat assembly of claim 1, wherein the second seat is configured in a same way as the first seat.

15. An aircraft comprising the seat assembly of claim 1.

16. A method of utilizing seating surfaces in an aircraft, comprising:
pivoting a backrest of a first seat, which comprises two substantially vertically extending side edges, a horizontal connection of which defines a transverse direction and between which a center line of the backrest is defined centrally, about a pivot axis offset from the center line in the transverse direction and formed by a vertical axis, wherein
the backrest is pivotable from a first, non-pivoted position to a second, pivoted position or vice versa, wherein
the backrest is locked in the respectively occupied position, and wherein
a seat surface of the first seat is released for individual use by a user of a second seat by pivoting the backrest into the second, pivoted position, wherein the second seat is located behind the first seat.

17. A seat, comprising:
a seat surface provided by a seat structure,
a backrest, the backrest having a pivot axis and being configured to be pivotable about the pivot axis,
wherein the backrest comprises two substantially vertically extending side edges, a horizontal connection of which defines a transverse direction and between which a center line of the backrest is centrally defined centrally,
wherein the pivot axis is formed by a vertical axis and is arranged in a position, that is offset from the center line of the backrest in the transverse direction, and
a seat surface of the first seat is releasable, by pivoting the backrest about the pivot axis, by a user of a second seat, for use of the seat surface of the first seat by the user of the second seat, and the second seat is positioned behind the first seat.

18. The seat according to claim 17, wherein the area of the seat surface is usable as a leg support for the user of the second seat.

19. The seat according to claim 17, wherein the area of the seat surface is usable for a small child or a seat shell of a small child, as a transport box for animals or for luggage.

20. The seat according to claim 17, wherein the seat is a component in an aircraft.

* * * * *